(12) United States Patent
McClung

(10) Patent No.: US 8,524,647 B2
(45) Date of Patent: Sep. 3, 2013

(54) METHOD OF MAKING A COMPOSITION AND THE USES THEREOF IN REMOVING OR DISSOLVING A CONTAMINANT FROM AN ENVIRONMENT

(76) Inventor: James E. McClung, Cedar Hill, TX (US)

( * ) Notice: Subject to any disclaimer, the term of this patent is extended or adjusted under 35 U.S.C. 154(b) by 0 days.

(21) Appl. No.: 13/323,733

(22) Filed: Dec. 12, 2011

(65) Prior Publication Data

US 2012/0213864 A1     Aug. 23, 2012

Related U.S. Application Data

(60) Continuation of application No. 11/056,853, filed on Feb. 11, 2005, now abandoned, which is a division of application No. 10/333,101, filed as application No. PCT/US01/24775 on Aug. 3, 2001, now abandoned.

(60) Provisional application No. 60/223,064, filed on Aug. 4, 2000.

(51) Int. Cl.
*C11D 7/08* (2006.01)
*C11D 7/18* (2006.01)
*C11D 7/54* (2006.01)

(52) U.S. Cl.
USPC .......... 510/372; 510/214; 510/477; 510/488; 510/505

(58) Field of Classification Search
USPC ...... 510/214, 372, 477, 488, 505; 134/22.19, 134/34, 36
See application file for complete search history.

(56) References Cited

U.S. PATENT DOCUMENTS

| | | | | |
|---|---|---|---|---|
| 5,122,538 A | * | 6/1992 | Lokkesmoe et al. | 514/557 |
| 5,674,538 A | * | 10/1997 | Lokkesmoe et al. | 424/616 |
| 5,858,117 A | * | 1/1999 | Oakes et al. | 134/27 |
| 2003/0087786 A1 | * | 5/2003 | Hei et al. | 510/375 |

* cited by examiner

*Primary Examiner* — Gregory DelCotto
(74) *Attorney, Agent, or Firm* — Greenberg Traurig, LLP; Ross Spencer Garsson

(57) ABSTRACT

A composition which is effective in removing a wide variety of contaminants, such as organic compounds, from a wide variety of environments, such as printing systems, is provided. A process of preparing such composition includes contacting hydrogen peroxide, glycolic acid, and water. The process can additionally include contacting with one or more additional components such as isopropyl alcohol.

8 Claims, No Drawings

METHOD OF MAKING A COMPOSITION AND THE USES THEREOF IN REMOVING OR DISSOLVING A CONTAMINANT FROM AN ENVIRONMENT

RELATED APPLICATIONS

This application is a continuation of U.S. patent application Ser. No. 11/056,853 filed on Feb. 11, 2005, now abandoned, which is a divisional of U.S. patent application Ser. No. 10/333,101, filed on Jul. 14, 2003, now abandoned, which is the 35 U.S.C. 371 U.S. National Application of International Application No. PCT/US2001/024775, filed Aug 3, 2001, which claims priority from provisional U.S. application Ser. No. 60/223,064 filed Aug. 4, 2000, and which disclosure is considered part of and is incorporated by reference in its entirety in the disclosure of this application.

BACKGROUND OF THE INVENTION a The invention relates to a method of making a composition and a product from such method wherein such composition is effective in reducing the concentration of a contaminant in an environment.

It is known that various processes used to produce printed materials such as printing processes and lithography processes utilize various machinery that contain several parts such as rollers, apparatus to contain and move fluids (such as hoses and trays), and other moving parts (such as gears and the like). Such machinery becomes contaminated with various contaminants, such as organic deposits, calcium deposits, bacteria, fungi, and additional residue created from the use of various organic-based inks and printing production fluids known in the art. Great difficulty is encountered in attempting to reduce the concentration of, preferably remove, such contaminants from the various parts of the machinery due, in part, to the difficulty in accessing the internal parts of such machinery.

In addition, when such contaminant residue is not removed on a consistent basis, it is known that such residue can accumulate and harden over time creating a residue which is difficult to remove and can cause undesirable chemical reactions to occur in the various processes. Processes used in the past to remove such residue have included mechanical removal that requires disassembling the machinery to access parts that contain such residue and then removing such residue by mechanical methods such as by hammering, chiseling, and the like. Such mechanical methods require significant downtime of the machinery and involve increased risk to the equipment and the personnel involved with removing such residue.

It is also known that various methods for removing such residue, other than mechanical methods, usually involve the use of fluids such as various solvents and surfactants. However, such solvents and surfactants do not completely remove such residue. Further, when such solvents and surfactants do not completely remove such residue, such residue begins to accumulate as discussed above. Thus, a composition and process of using such composition for removing contaminants from machinery such as printing and lithography equipment that does not require mechanical methods of removing such residue, provides for a substantially complete removal of such residue, and helps to prevent the accumulation of such residue, would be of significant contribution to the art and to the economy.

It is also known that various industrial processes used to produce goods utilize various systems, such as packaging systems, flexographic systems, food processing systems, bleaching systems, metallurgy systems, acid washing systems, veterinary product systems, pesticide systems, meat processing systems, poultry processing systems, dairy processing systems, sanitizing systems, and the like and combinations thereof, which contain several parts such as gears, rollers, and the like. Such parts can become contaminated with various contaminants such as organic and calcium deposits, calcium and starch-based glues, and the like and combinations thereof. Various compositions known to reduce the concentration of, or remove, such contaminants utilize compositions which are difficult to dispose of due to environmental regulations and can present significant safety hazards. Thus, a composition, useful for removing such contaminants from such systems, which is non-toxic, easy to prepare, and capable of being disposed of without costly disposal procedures would also be of significant contribution to the art and to the economy.

It is also known that various industrial processes used to produce goods such as paper and pulp products utilize various water-containing systems. Such water-containing systems are also found in various printing systems, water treating systems, drainage systems, boiler systems, chiller systems, and the like. Use of such water-containing systems presents several problems relating to the fouling of such water-containing systems with various contaminants such as scale, algae, fungi, bacteria, surfactants, various organic compounds, and the like. The contaminants can foul such water-containing systems to such an extent that such water-containing systems require extensive cleaning to remove such contaminants, which results in a decrease in production of goods.

Various known compositions that can be used for reducing the concentration of, preferably removing or dissolving, such contaminants from such water-containing systems frequently utilize chlorine. However, use of such chlorine-based compositions present various environmental and safety hazards and further, disposal of such products produced using such chlorine-based compositions requires close environmental scrutiny and regulation. In addition, such chlorine-based compositions are frequently utilized in gaseous form which requires extensive safety and training procedures to be utilized. Thus, a composition, useful for removing or dissolving one or more contaminants from an environment that contains water-based systems, which is non-toxic, inexpensive, and easy to prepare and use would be of significant value to the art and to the economy.

In addition, compositions, useful in reducing the concentration of, preferably removing or dissolving, contaminants from an environment, which contain more than one component commonly require one of the components to be added to the environment first, followed by the addition of a second component. The two components must then react "in situ" to thereby provide a composition that can remove or dissolve the contaminants contained within the environment. Such compositions can be difficult to use due to the difficulty in determining how much of each component of the composition should be added. Thus, a composition useful in reducing the concentration of, preferably removing or dissolving, contaminants from an environment and that can be prepared "ex situ" in various concentrations, which can then be added to an environment to remove or dissolve contaminants would be of significant contribution to the art and to the economy.

In addition, a composition useful in reducing the concentration of, preferably removing or dissolving, contaminants from an environment which is prepared from easily accessible components and which can be prepared by a simple procedure utilizing a minimum of preparation apparatus would also be of significant contribution to the art and to the economy.

SUMMARY OF THE INVENTION

An object of the present invention is to provide a process for preparing a composition which is useful for reducing the concentration of, preferably removing or dissolving, one or more contaminants from an environment. Such process utilizes components which are inexpensive to use and easy to prepare. Another object of the present invention is to provide a process for preparing a composition which utilizes a simple and effective method which provides a composition having desirable properties such as enhanced capabilities for reducing the concentration of, preferably removing or dissolving, a contaminant from an environment when compared to a composition prepared by other methods.

A further object of the present invention is to provide an improved process of reducing the concentration of, preferably removing or dissolving, a contaminant from an environment.

An embodiment of the present invention is a novel composition prepared by a process comprising contacting hydrogen peroxide, glycolic acid (also referred to as hydroxy acetic acid), and water.

Another embodiment of the present invention is a process of preparing a novel composition comprising contacting hydrogen peroxide, glycolic acid, and water. The process can further comprise contacting with one or more additional components such as isopropyl alcohol.

A novel composition of the present invention can be used for reducing the concentration of, preferably removing or dissolving, a wide variety of contaminants from a wide variety of environments. Such contaminants can include Groups II-VIII of the Periodic Table of the Elements, algae, fungi, bacteria, surfactants, natural gums, synthetic gums, organic compounds, paper fillers, paper filters, clays, sulfites, sulfates, oxides, adhesives, starches, and the like and combinations thereof. Such environments can include water-containing systems, paper producing systems, pulp producing systems, printing systems, packaging systems, flexographic systems, food processing systems, bleaching systems, metallurgy systems, acid washing systems, veterinary product systems, pesticide systems, meat processing systems, poultry processing systems, dairy processing systems, sanitizing systems, and the like and combinations thereof. Such water-containing systems can include swimming pools, water treating systems, drainage systems, boiler systems, chiller systems, sewage treating systems, irrigation systems, agriculture systems, cooling tower systems, and the like and combinations thereof.

Other objects and advantages of the present invention will become apparent from the detailed description of the invention and the appended claims.

DETAILED DESCRIPTION OF THE INVENTION

It has been discovered that the performance of a composition when reducing the concentration of, preferably removing or dissolving, one or more contaminants from an environment can be improved by utilizing a novel process of preparing such composition which comprises contacting hydrogen peroxide and glycolic acid.

Generally, a process of preparing a composition of the present invention comprises contacting hydrogen peroxide, glycolic acid, and water. The hydrogen peroxide is generally present as a hydrogen peroxide solution comprising hydrogen peroxide and water. Such hydrogen peroxide solution generally comprises at least about 0.1 weight percent hydrogen peroxide in water and at most about 20 weight percent hydrogen peroxide in water, preferably at least about 0.5 weight percent hydrogen peroxide in water and at most about 15 weight percent hydrogen peroxide in water, and more preferably at least about 1 weight percent hydrogen peroxide in water and at most about 15 weight percent hydrogen peroxide in water. An example hydrogen peroxide solution which can be used in a process of the present invention can be prepared by adding a stabilizing amount of water to a commercially available 35 weight percent technical grade solution of hydrogen peroxide in water from FMC Corporation, Philadelphia, Pa., to thereby obtain a hydrogen peroxide solution suitable for use in a process of the present invention.

The water suitable for use in a process of the present invention is preferably a low solids water generally comprising less than about 10 parts per million (ppm) dissolved solids, preferably less than about 5 ppm dissolved solids, more preferably less than about 1 ppm dissolved solids, and most preferably about 0 ppm dissolved solids. An example low solids water which can be used in a process of the present invention can be obtained commercially from PGT Inc., Cedar Hill, Tex., which is a low solids water produced by reverse osmosis having less than about 0.1 ppm dissolved solids.

The water, preferably low solids water, can be prepared by any suitable means known in the art for preparing water which can be used in a process of the present invention. Generally, the low solids water can be prepared by subjecting a high solids water to a treating means selected from the group consisting of reverse osmosis, deionization, and the like and combinations thereof. The high solids water generally comprises more dissolved solids than the low solids water. Generally, the high solids water comprises more than about 200 ppm of dissolved solids.

Generally, water is present in a stabilizing amount which allows for the contacting of hydrogen peroxide and glycolic acid according a process as described herein. Generally, a stabilizing amount of water as described herein should be large enough to prevent an uncontrollable or unpredictable reaction between the hydrogen peroxide and glycolic acid which can occur in a non-dilute environment as known in the art. However, a stabilizing amount of water as described herein should be small enough to prevent the resulting composition from being so dilute that such resulting composition no longer has the ability to reduce the concentration of, preferably remove or dissolve, a contaminant from an environment as described herein. Thus, a novel aspect of the present invention is the presence of a stabilizing amount of water, preferably low solids water, which is large enough to allow the contacting of such hydrogen peroxide and glycolic acid in a predictable and controllable manner, yet, is small enough to prevent a significant dilution of the resulting composition so that such composition is effective in reducing the concentration of, preferably removing or dissolving, a contaminant from an environment as described herein.

Generally, a stabilizing amount of water, preferably low solids water, is present in an amount of at least about 50 percent by weight water based on the total weight of the hydrogen peroxide, glycolic acid, and water, and at most about 99.9 percent by weight water based on the total weight of the hydrogen peroxide, glycolic acid, and water. Preferably, a stabilizing amount of water is present in an amount of at least about 60 percent by weight water based on the total weight of the hydrogen peroxide, glycolic acid, and water, and at most about 97 percent by weight, and more preferably a stabilizing amount of water is present in an amount of at least about 70 percent by weight water based on the total weight of the hydrogen peroxide, glycolic acid, and water, and at most about 95 percent by weight water based on the total weight of the hydrogen peroxide, glycolic acid, and water.

The glycolic acid is preferably a glycolic acid solution comprising glycolic acid and water. Such glycolic acid solution generally comprises at least about 1 weight percent glycolic acid and at most about 15 weight percent glycolic acid, preferably at least about 1 weight percent glycolic acid and at most about 10 weight percent glycolic acid, and more preferably comprises at least about 1 weight percent glycolic acid and at most about 5 weight percent glycolic acid. An example glycolic acid solution which can be used in a process of the present invention can be obtained by adding low solids water as described herein to a commercially available 70 weight percent technical grade solution of glycolic acid obtained from DuPont Chemical, Wilmington, Del., to thereby obtain a 5 weight percent glycolic acid solution.

The hydrogen peroxide, glycolic acid, and water can be contacted by any suitable means and in any suitable order which provides for a composition of the present invention effective in reducing the concentration of, preferably removing or dissolving, a contaminant from an environment. Preferably, such contacting comprises mixing utilizing any suitable. mixing means known in the art for mixing an aqueous solution with another aqueous solution. More preferably, a hydrogen peroxide solution as described herein is mixed with a glycolic acid solution as described herein. During contacting, the weight ratio of hydrogen peroxide to glycolic acid is generally at least about 1:1 and at most about 30:1, preferably at least about 2:1 and at most about 20:1, more preferably at least about 2:1 and at most about 10:1, and most preferably at least about 2:1 and at most about 6:1.

The temperature during contacting of the hydrogen peroxide, glycolic acid, and water, preferably during the contacting of the hydrogen peroxide solution and glycolic acid solution, can be any temperature which provides a composition effective in reducing the concentration of, preferably removing or dissolving, a contaminant from the environment as described herein. Generally, the temperature during contacting is at least about 0° F. and at most about 100° F., preferably at least about 10° F. and at most about 90° F., and more preferably at least about 20° F. and at most about 80° F. The pressure during contacting can be any pressure o which provides for a composition as described herein. The pressure is generally at least about atmospheric and at most about 100 pounds per square inch absolute (psia), preferably about atmospheric. The time period of contacting can be any time period capable of providing for a composition as described herein. The time period of contacting is generally at least about 0.1 minute and at most about 60 minutes, preferably at least about 0.1 minute and at most about 30 minutes.

A process of providing a composition of the present invention can further comprise contacting with an additional component comprising isopropyl alcohol. Generally, the isopropyl alcohol has a purity of at least about 95 percent, preferably at least about 98 percent, and more preferably at least about 99 percent.

In addition to, or in lieu of, contacting with isopropyl alcohol, a process of the present invention can further comprise contacting with one or more components selected from the group consisting of potassium monopersulfate, silver, acids, esters, alcohols, alpha hydroxy acids, beta hydroxy acids, esters, and the like and combinations thereof. Examples of suitable esters include, but are not limited to, ethoxylated esters and the like and combinations thereof. Examples of suitable acids include, but are not limited to, acetic, sulfuric, formic, peroxyacetic, and the like and combinations thereof. Examples of suitable alpha hydroxy and beta hydroxy acids include, but are not limited to, citric, lactic, maleic, and the like and combinations thereof.

Such additional component(s) can be added in any amount(s) as long as such amount(s) provides a composition effective in reducing the concentration of, preferably removing or dissolving, a contaminant from an environment as described herein. Generally, when such additional component(s) is present, such additional component(s) is present in an amount of at least about 0.1 weight percent based on the total weight of the final composition and at most about 20 weight percent based on the total weight of the final composition, preferably in an amount of at least about 0.1 weight percent based on the total weight of the final composition and at most about 10 weight percent based on the total weight of the final composition, and more preferably in an amount of at least about 0.1 weight percent based on the total weight of the final composition and at most about 5 weight percent based on the total weight of the final composition.

A preferred method of preparing a composition of the present invention comprises mixing a 35 weight percent solution of hydrogen peroxide in water with a stabilizing amount of low solids water comprising less than about 1 ppm dissolved solids to thereby provide a resulting mixture comprising about 80 weight percent low solids water and the rest comprising the hydrogen peroxide solution. The resulting mixture is then contacted with a 5 weight percent glycolic acid solution prepared by contacting a 70 weight percent glycolic acid solution with low solids water comprising less than about 1 ppm dissolved solids to provide a composition having a pH of about 1.9 to about 3.5.Such composition is particularly suitable for use in reducing the concentration of, preferably removing or dissolving, calcium and starch glues and organic substances and mineral residue typically found in corrugated box manufacturing and printing and flexography processes.

Another preferred method of preparing a composition of the present invention comprises mixing a 35 weight percent solution of hydrogen peroxide in water with a stabilizing amount of low solids water comprising less than about 1 ppm dissolved solids to thereby provide a resulting mixture comprising about 43 weight percent low solids water and the rest comprising the hydrogen peroxide solution. The resulting mixture is then contacted with a 5 weight percent glycolic acid solution prepared by contacting a 70 weight percent glycolic acid solution with low solids water comprising less than about 1 ppm dissolved solids to provide a composition having a pH of about 1.9 to about 3.5.Such resulting composition is particularly suitable for use in reducing the concentration of, preferably removing or dissolving, contaminants typically found in water-containing systems.

An additional preferred process of preparing such composition is to further contact the resulting composition with isopropyl alcohol having a purity of about 99 percent in an amount to provide a resulting composition containing such isopropyl alcohol in an amount of about 5 weight percent based on the total weight of the final composition.

A composition of the present invention generally has a pH of at least about 1.5 and at most about 4.5, preferably at least about 1.7 and at most about 4, and more preferably at least about 1.9 and at most about 3.8.

A composition of the present invention generally has a specific gravity of at least about 1.0 and at most about 1.5, preferably at least about 1.1 and at most about 1.4, more preferably at least about 1.3 and at most about 1.4, and most preferably about 1.35.

While not intending to be bound by theory, it is believed that a composition of the present invention comprises a molecule containing two carbon atoms, four hydrogen atoms, and four oxygen atoms. It is further believed that two of the four hydrogen atoms and two of the four oxygen atoms are present as hydroxyl groups (OH).

A composition of the present invention prepared by a process of the present invention described herein can be utilized to reduce the concentration of, preferably remove or dissolve, a wide array of contaminants from a wide array of environments. Such process generally comprises contacting such contaminant(s) with a concentration of a composition of the present invention, prepared according to a process as described herein, in a concentration effective in reducing the concentration of, preferably removing or dissolving, such contaminant(s) from such environment. Examples of suitable contaminants include, but are not limited to, elements of Groups of the Periodic Table of the Elements (also referred to as Group II elements, Group III elements, Group IV elements, Group V elements, Group VI elements, Group VII elements, and Group VIII elements), algae, fungi, bacteria, surfactants, natural gums, synthetic gums, organic compounds, paper fibers, paper filters, clays, sulfites, sulfates, oxides, adhesives, starches, and the like and combinations thereof.

Examples of a suitable environment include, but are not limited to, water-containing systems, paper producing systems, pulp producing systems, printing systems, packaging systems, flexographic systems, food processing systems, bleaching systems, metallurgy systems, acid washing systems, veterinary product systems, pesticide systems, meat processing systems, poultry processing systems, dairy processing systems, sanitizing systems, and the like and combinations thereof. The term "system" refers to any method, process, apparatus, components, and the like and combinations thereof related in any way or manner to the disclosed type of system. For example, the term "water-containing systems" refers to any method, process, apparatus, components, and the like and combinations thereof known in the art related in any way or manner to water containing or containment. Also for example, the term "food processing systems" refers to any method, process, apparatus, components, and the like and combinations thereof known in the art related in any way or manner to food processing. Also for example, the term "printing systems" refers to any method, process, apparatus, components, and the like and combinations thereof known in the art related in any way or manner to printing.

Examples of suitable water-containing systems include, but are not limited to, swimming pools, water treating systems, drainage systems, boiler systems, chiller systems, sewage treating systems, irrigation systems, agricultural systems, cooling tower systems, and the like and combinations thereof.

A composition of the present invention can be contacted with one or more contaminants as described herein by any suitable means and under any suitable conditions which are effective in reducing the concentration of, preferably removing or dissolving, such contaminants from an environment. The contacting condition, also referred to as the contaminant contacting condition, which comprises a concentration of a composition as described herein, a contacting temperature, a contacting pressure, and a contacting time period can be any contacting condition effective in reducing the concentration of, preferably removing or dissolving, a contaminant from an environment as described herein. The contacting condition will generally depend on the type and concentration of contaminant and type of environment. For example, the contacting condition will generally have an increased composition concentration, temperature, pressure, and time period when the concentration of one or more contaminants is increased compared to the contacting condition necessary when such contaminants are present in a reduced concentration. For example, when a composition of the present invention is used as a swimming pool shock treatment to help initially reduce the concentration of, preferably remove or dissolve, a contaminant, the composition concentration will be significantly increased and the time period decreased compared to when a composition of the present invention is used to maintain the reduction in concentration of contaminants in such swimming pool over, for example, a thirty day period. Selecting the proper contacting condition based on the concentration of contaminants within an environment is within the skill in the art.

When the environment comprises a liquid medium, such as the water-containing systems described herein, the concentration of composition is generally at least about 0.1 part composition by volume per million parts environment (ppmv) and at most about 25 volume percent, preferably at least about 0.5 ppmv and at most about 20 volume percent, and more preferably at least about 1 ppmv and at most about 15 volume percent. When the environment does not comprise a liquid medium, such as when the composition is applied directly to a contaminant, the concentration of composition is generally at least about 0.1 part composition by weight per million parts environment (ppm) and at most about 20 weight percent, preferably at least about 0.5 ppm and at most about 10 weight percent, and more preferably at least about 1 ppm and at most about 5 weight percent.

Generally, the contacting temperature, also referred to as the contaminant contacting temperature, is at least about 50° F. and at most about 200° F., preferably at least about 70° F. and at most about 150° F. The contacting pressure, also referred to as the contaminant contacting pressure, is generally at least about atmospheric and at most about 100 pounds per square inch absolute (psia), preferably about atmospheric. The contacting time, also referred to as the contaminant contacting time, is generally at least about 0.1 minute and at most about is 30 days, preferably at least about 0.5 minute and at most about 20 days, and more preferably at least about 1 minute and at most about 10 days.

Examples of suitable uses of a composition of the present invention include, but are not limited to, the following.

A composition of the present invention can be used as a descalant, biocide, slimicide, flocculant, and the like and combinations thereof to reduce the concentration of, preferably remove or dissolve, scale, algae, and the like and combinations thereof from machinery and apparatus used to produce paper and pulp.

A composition of the present invention can be used as a descalant, biocide and/or algaecide to reduce the concentration of, preferably remove or dissolve, various contaminants from water-containing systems used in the printing industry. For example, a composition of the present invention can be used as a calcium and surfactant remover to reduce the concentration of, preferably remove or dissolve, calcium, dissolved minerals, surfactants, bacteria, and the like and combinations thereof from the lines and tanks of water-containing systems used in the printing industries, packaging industries, and the like and combinations thereof. Also for example, a composition of the present invention can be used to reduce the concentration of, preferably remove or dissolve, various surfactants, natural gums, calcium carbonate, polymer-containing residue, and the like and combinations thereof from lithographic plate surfaces. A composition of the present invention can also be used as a rubber roller rinse to reduce the concentration of, preferably remove or dissolve, organic contaminants, water-based contaminants, and liquid metal precipitants including, but not limited to, paper fiber, paper fillers, clay coatings, sulfites, sulfates, titanium dioxide, chromium, barium, calcium carbonate, and the like and combinations thereof. The reduction in concentration, preferably the removing or dissolving, of these contaminants results in improved consistency of ink transfer and aids in restricting the neutralization of acid fountain chemistries commonly used in lithography and lithographic processes.

A composition of the present invention can be used for reducing the concentration of, preferably removing or dissolving, a contaminant such as scale, algae, fungi, bacteria, minerals, and the like and combinations thereof from water-containing systems such as water tanks, water lines, pumps, and the like and combinations thereof. Such contaminants are known to exist in such water-containing systems commonly utilized in the printing and paper industries and the like because of the high contact rate with paper products which contain mold, fungi spores and bacteria which are commonly found in the wood used to produce such paper products.

A composition of the present invention can be used to reduce the concentration of, preferably remove or dissolve, an adhesive. In various processes, such as the process of manufacturing corrugated boxes and packaging, glues and adhesives containing organic compounds and starches are commonly used. A composition of the present invention can be contacted, such as by spraying, with such glues and adhesives and, after a time period effective for allowing a composition of the present invention to penetrate such glues and adhesives, can thus provide for easy removal of such glues and adhesives.

A composition of the present invention can be used to treat anilox rolls, particularly the cells contained by, or within, such anilox rolls, commonly found in flexographic situations. Anilox rolls commonly utilized in flexographic situations commonly contain organic substances of microscopic size found in various concentrations. There are various methods of applying various compositions to remove such substances which include spraying onto the surface being treated, mechanically applying to the surface, immersion treating, and the like and combinations thereof. Utilizing a composition of the present invention provides an improvement over existing technologies of cleaning anilox rolls which are currently being used such as baking soda blasting, ultra-sonic cleaning, and utilizing chemicals of high alkalinity concentration.

A composition of the present invention can be used to reduce the concentration of, preferably remove or dissolve, various contaminants commonly found in food processing and food packaging environments and the like.

A composition of the present invention can be used in waste sludge treatment processes to help break down solids and provide biocide effects.

A composition of the present invention can be used as an industrial biocide treatment to kill various fungi such as the bottrus fungi, mold or bacteria.

A composition of the present invention can be used to enhance the bleaching processes commonly found in the textile industries, paper and pulp industries, and the like and combinations thereof.

A composition of the present invention can be used to enhance the effectiveness of known descalants, slimicides, antimicrobials, and the like and combinations thereof.

A composition of the present invention can be used in fish farming and agricultural processes as a pesticide for killing microorganisms and/or parasites, including bacteria and fungi, found to exist within such processes. Such agricultural processes include, but are not limited to, agricultural rendering and growing, including various related holding areas which can contain such bacteria, fungi, and parasites.

A composition of the present invention can be used to reduce the concentration of, preferably remove or dissolve, various contaminants commonly found in meat, poultry, and dairy rendering and processing facilities.

A composition of the present invention can be used to reduce the concentration of, preferably remove or dissolve, various contaminants commonly found in metallurgy processes involving copper or other metals.

A composition of the present invention can be used to reduce the concentration of, preferably remove or dissolve, various contaminants commonly found in processes comprising the acid-washing of concrete.

A composition of the present invention can be used to reduce the concentration of, preferably remove or dissolve, various contaminants commonly found in processes to produce veterinary products.

A composition of the present invention can be used to reduce the concentration of, preferably remove or dissolve, various contaminants commonly found in beer processing systems, wine processing systems, and the like such as removing contaminants from various vats.

A composition of the present invention can be used to reduce the concentration of, preferably remove or dissolve, various contaminants from the surfaces of automobiles such as removing bug and tar residue from an external surface, e.g., a bumper, of a car or truck.

A composition of the present invention can be used as an additive in various products used in the cosmetic industry such as face-peel products.

A composition of the present invention can be used to reduce the concentration of, preferably remove or dissolve, contaminants such as calcium-based and organic-based substances commonly found in the marine industry such as from the external surfaces of ships.

Preferably, a composition of the present invention is used to reduce the concentration of, preferably remove or dissolve, contaminants from printing systems. A composition of the present invention can be used in addition to, or preferably as an alternative to, various mechanical means and the use of various solvents and/or various surfactants, such as sodium hydroxide, to remove such contaminants.

Also preferred, a composition of the present invention is used as a sanitizer, fungicide, algaecide, and the like and combinations thereof to reduce the concentration of, preferably remove or dissolve, contaminants from water-containing systems such as swimming pools, water gardens, and the like and combinations thereof. A composition of the present invention can be used in addition to, or preferably as an alternative to, chlorine-based, or bromide-based, or biguianide-based compositions.

Also preferred, a composition of the present invention is used as a sanitizer, fungicide, algaecide, and the like and combinations thereof to reduce the concentration of, preferably remove or dissolve, contaminants from water-containing systems commonly found in municipal water treating systems, commercial drainage systems, industrial boiler systems, industrial chiller systems, cooling tower systems, and the like and combinations thereof. A composition of the present invention can be used in addition to, or preferably as an alternative to, chlorine-based, or bromide-based, or biguianide-based compositions.

The following examples are presented to further illustrate this invention and are not to be construed as unduly limiting the scope of this invention.

EXAMPLE I

This example illustrates a preparation of a composition of the present invention.

A 55-gallon quantity of a composition of the present invention was prepared by mixing 8.25 gallons of 35 weight percent hydrogen peroxide solution (obtained from FMC Corporation, Philadelphia, Pa., as a 35 weight percent technical grade solution of hydrogen peroxide in water) with 34.675 gallons of low solids water comprising less than about 0.1 ppm dissolved solids (obtained from PGT Inc., Cedar Hill, Tex., the low solids water had been produced by reverse osmosis) at room temperature (about 70° F.) and atmospheric pressure to thereby provide a resulting mixture. Total mixing time was about 15 minutes. The resulting mixture was then contacted with 11.55 gallons of a 5 weight percent glycolic acid solution which had been prepared by contacting 0.825 gallons of approximately 70 weight percent glycolic acid solution (obtained from DuPont Chemical, Wilmington, Del., as a 70 weight percent technical grade solution of glycolic acid in water) with 10.725 gallons of low solids water comprising less than about 0.1 ppm dissolved solids (obtained from PGT Inc., the low solids water had been produced by reverse osmosis) at room temperature (about 70° F.) and atmospheric pressure to thereby obtain about 55 gallons of a composition of the present invention referred to herein as "Composition A" having a pH of about 3.3.

EXAMPLE II

This example illustrates the use of a composition of the present invention (Composition A as described herein) to reduce the concentration of, preferably remove or dissolve, calcium and/or starch glues and substances from corrugating equipment used in manufacturing corrugated boxes.

Equipment was obtained from Packaging Corporation of America (PCA) located in Waco, Tex. and had been in use for several years. A significant amount of glue residue (color of such residue was a dirty-white due to the glue drying to a semi-translucent appearance over time) was observed. A significant concentration of glue residue was located on a cross-member of the adhesive application device of such equipment about 10 inches under the glue applicator which applied the glue to the web paperboard to form a corrugated box sheet. The glue residue level had accumulated to such an extent that production problems were encountered. PCA had requested assistance from several chemical companies to develop a product which would remove or allow removal of the glue residue. It is believed is that twenty unsuccessful attempts were made by the various chemical vendor companies to do so. Composition A was then applied directly to the glue residue using a trigger sprayer Within about 5 minutes, the semi-translucent appearance of the glue residue turned to a white color as such glue residue originally appeared (i.e., the appearance of the glue before it dried). Layer by layer the accumulated glue residue turned white. Within about 20 minutes, the layers of residue were all visibly re-hydrated and could be removed by hand by peeling each layer from the cross-member. When Composition A reached the bottom layer of residue which had been estimated as having initially formed over 20 years prior, such bottom layer was able to be removed which enabled the equipment to be operated again. Overall, maintenance problems for the equipment based on glue residue was minimized. Before the application of Composition A, the preferred and possibly only means to remove this residue was with a hammer and chisel. The hammer and chisel were used to chisel the layers away from the cross-member section of the adhesive application device.

EXAMPLE III

This example illustrates another use of a composition of the present invention (Composition A as described herein) to remove organic substances and mineral residue from equipment such as anilox rolls used in flexography processes.

Equipment utilizing anilox rolls was provided by Packaging Corporation of America (PCA) located in Waco, Tex. Such equipment had been used for several years. An inherent problem which exists in flexography processes is various contaminants have a tendency to accumulate and bond to small laser-etched cells within the anilox rolls. These cells supply water and solvent-based flexography inks to the raised image photo-polymer printing plate. After removal of excess flexography inks, there are multiple procedures used to remove sealants and residue from the anilox rolls. The anilox rolls of the PCA equipment had various mineral and ink component deposits which could not be easily removed by previous methods, such as baking soda blasting and using ultrasound equipment.

In a first method, Composition A was sprayed directly onto the surface of the anilox roll cells having a concentration of 145 cells per linear inch of anilox roll. The anilox roll was hydrated with Composition A and remained hydrated for about 5 minutes. Thereafter, a standard aqueous-based flexographic wash was used to rinse the contamination out of the cells. The application of Composition A appeared to decompose the bonded minerals and deposits, allowing such bonded minerals and deposits to be removed by washing with normal alkaline types of flexography wash. This process allowed for recovery of cell depth and cell volume of the anilox rolls. Composition A allowed for the anilox equipment to be cleaned on press, without the costly purchase of cleaning equipment, which provided a reduction in down-time and capital expenditure costs for PCA.

The second method of applying Composition A was by adding Composition A to the flexography printing unit ink reservoir contacting the ink pump. The contact time was about five minutes followed by rinsing using standard aqueous-based flexographic wash a procedures. Previously, methods such as baking soda blasting and using ultrasound equipment were utilized, but had only cleaned the surface of the anilox cells. Composition A performed better than such previous methods and opened the cells to a like-new condition.

EXAMPLE IV

This example illustrates another preparation of a composition of the present invention.

A 55-gallon quantity of a composition of the present invention was prepared by mixing 18.15 gallons of a 35 weight percent hydrogen peroxide solution (obtained from FMC Corporation, Philadelphia, Pa., as a 35 weight percent technical grade solution of hydrogen peroxide in water) with 13.75 gallons of low solids water comprising less than about 0.1 ppm dissolved solids (obtained from PGT Inc., Cedar Hill, Tex., the low solids water had been produced by reverse osmosis) at room temperature (about 70° F.) and atmospheric pressure to thereby provide a resulting mixture. Total mixing time was about 15 minutes. The resulting mixture was then contacted with 23.1 gallons of a 5 weight percent glycolic acid solution which had been prepared by contacting 1.65 gallons of 70 weight percent glycolic acid solution (obtained from DuPont Chemical, Wilmington, Del., as a 70 weight percent technical grade solution of glycolic acid in water) with 21.45 gallons of low solids water comprising less than about 0.1 ppm dissolved solids (obtained from PGT Inc., Cedar Hill, Tex., the low solids water had been produced by reverse osmosis) at room temperature (about 70° F.) and atmospheric pressure to thereby obtain about 55 gallons of a composition of the present invention referred to herein as "Composition B" having a pH of about 2.2.

EXAMPLE V

This example illustrates a use of a composition of the present invention (Composition B as described herein) to remove residue and bacterial growth and fungi from a printing press fountain solution recirculating system (a water-containing system).

A printing press was obtained from Rock Term Company, Waxahachie, Tex., and contained a Man Roland fountain solution recirculating system, also referred to as a dampening system, which comprised a blender, chiller, and recirculating unit containing an approximately 30 gallon reservoir with a total capacity of 200 gallons of water. The equipment has been used almost continuously for about 20 years. A significant amount of mineral substance residue, such as mineral deposits consisting of calcium and lime deposits, and bacterial and fungi growth was observed, including hair algae, which were white, green, brown and various other colors which are common to the industry. Various solvents had been used in an attempt to remove the residue and growth before such residue had accumulated and caused production interruptions. Common industry products used for cleaning such printing press recirculating systems included products comprising a mixture of sodium hydroxide, glycol ethers, and various biocides, such as those sold by various chemical manufacturers, including Varn International (a worldwide chemical manufacturer which manufactures pressroom and printing chemicals and distributes such products throughout the world).

However, use of such solvents was unsuccessful in removing the mineral residue and bacterial and fungal growth. The mineral residue and growth had accumulated to a point that such had become hardened within the water lines and could not be removed. The lines had become plugged, making production difficult. An additional option of replacing the water lines and/or flushing the water system with bleach would have been an option, but the amount of water which would have to be consumed would have amounted to thousands of gallons of water. In addition, production-related issues resulting from bleach residue would have been difficult to alleviate, making the bleaching option undesirable and economically unfeasible.

A five-gallon quantity of Composition B described herein was supplied for the following procedure. Composition B was poured directly, in one-pint quantities, into each of the six water trays of the recirculating system. Upon contact of Composition B with the mineral residue and bacterial and algae growth, it was observed that within about 15 to 30 seconds, water immediately began flowing in the return line from the press back to the recirculating system indicating that Composition B was removing the various contaminants. Then, the drain of the recirculating system became unplugged so that water could easily flow. An additional four-gallon quantity of Composition B was then added directly to the 30-gallon reservoir. Within about 15 to 30 seconds, water immediately began flowing in the return line from the press back to the reservoir indicating that Composition B was removing the various contaminants. It was observed that the substance being removed by Composition B contained paper dust, slime, fungus, algae, ink components, and the like. About 35 gallons of such substance were collected in an empty barrel. In about 30 minutes, about 200 gallons of fresh water were passed through the water system to further help remove the debris and remains of dead algae and bacterial growth and minerals which had been dislodged and/or dissolved by Composition B.

The recirculating system was then recharged with a standard fountain solution having a pH of about 3.8.The press was immediately placed into production. Normal startup recovery time had previously been about 20 to 25 printed sheets before production. After use of Composition B, startup recovery time was about 2 to 3 sheets. It is believed that the better startup was because the pH of Composition B was at or near the recommended pH of the fountain solution. Before use of Composition B, products previously used comprised sodium hydroxide, glycol ethers and biocides, with some of these products containing foaming agents or alkalines such as caustic soda. The residual pH left in the water system after using traditional cleaning products would normally be in a range of about 9 to about 10.5.Thus, since the pH of fountain solutions is typically in a range of about 3.8 to about 4.0 and since Composition B has a similar residual pH, use of Composition B provides a direct benefit to production ability, print quality, and reduction of water costs.

EXAMPLE VI

This example illustrates a use of a composition of the present invention (Composition B as described herein) to remove a contaminant from a swimming pool.

The test site consisted of a swimming pool which contained 25,000 gallons of water which was substantially free of chlorine and other chemical substances. The swimming pool was rectangular in shape with a shallow end depth of approximately three feet and a deep end depth of approximately nine feet. The swimming pool had been covered and dormant for about nine months. Before treatment, the water appeared blackish in color and emitted a strong foul odor. The surface areas of the pool under water were covered with a green algae growth which was about 1.5 inches thick. The green algae growth appeared to cover an underlying gray-colored algae-type substance. Due to the extensive algae growth, the bottom surface of the pool and the surfaces of the first and second steps of the pool were not visible. The filter media contained in the swimming pool filtration system was diametaceous earth. The pH of the water was 7.2 and the temperature of the water was about 78° F.

A ten-gallon quantity of Composition B described herein was then added to the pool by pouring Composition B at a steady rate into the pool from a plastic bucket while walking around the edges of the pool from the shallow to the deep end. After approximately twenty-five minutes, the color of the water turned to a light green "pea-soup" color. Debris began to float to the top and such debris appeared to be large pieces of the green algae and gray-colored algae-type substance. The clarity of the water continued to improve. After approximately twenty-four hours, the water appeared to be somewhat cloudy or "milky" in to color. The green algae and gray-colored algae-type substance appeared to have been "killed"

with the remains of such algae appearing as a white skeletal debris which covered the bottom of the pool with some of the debris floating on top. The pH of the pool was 6.8. A flocculent was then added in an amount of about two fluid quarts to aid in the removal of the floating debris. After approximately seventy-two hours from the addition of Composition B, the bottom of the pool was vacuumed and the vacuumed debris was exhausted into an area next is to the pool. The pH of the pool was 6.8. Tap water was then added to the pool until the pH of the pool water was 7.0.

The pool water remained uncovered, dormant, and was not circulated for two weeks. After the two-week period, the dissolved oxygen (DO) was 106 parts per million (ppm), the water appeared to very clear (the bottom surface of the deep end was visible), and the pump used to circulate the pool water was started and set to circulate the pool water for two hours each day. One week later (three weeks total time from the addition of Composition B), which included a two-inch rain, the DO was 98 ppm. After one more week (four weeks total time from the addition of Composition B), the DO was 44 ppm. The water was still clear, but several small areas of green algae growth on the surface areas of the pool underwater were observed.

A 2.5 gallon "maintenance dose" of Composition B described herein was then added to the pool by pouring from a plastic bucket at one end of the pool After adding, the DO was 100 ppm (which was the desired reading) and the pH was 7.4. The pool was then maintained at a dosage rate of 2.5 gallons of Composition B added every two weeks.

EXAMPLE VII

This example demonstrates the effect of various increases in concentration of a composition of the present invention.

Two test sites (1 and 2) were utilized to determine the toxicity of a composition of the present invention. Test site 1 consisted of an outdoor water garden comprising a circular-shaped fiberglass molded tank having a diameter of about 5 feet and which contained approximately 500 gallons of water. The tank also contained soil, rock, several bricks, and 36 minnows. The water was foul-smelling and black in color. A substance which appeared to be a black mold or algae covered the soil and rocks at the bottom of the tank.

An eight fluid ounce quantity of Composition B described herein was then added to the tank by pouring Composition B directly from a plastic bottle into the water at one end of the tank. The temperature of the water during addition was about 78° F. Upon addition, the water immediately began to bubble. The bubbling began on one end of the tank and proceeded to the other end of the tank within about 15 minutes. After 24 hours had elapsed, the water appeared to be clear and the bricks and rock contained within the tank were completely visible and were no longer covered with the black mold or algae. The minnows appeared to be unaffected by the addition of Composition B. Skeletal debris appeared to cover the bottom of the tank. A pH reading and dissolved oxygen reading were not obtained. Based on the observations, a recommended dosage rate of eight ounces of Composition B applied every two to three weeks was developed.

Test site 2 consisted of a standard 29-gallon aquarium containing six gallons of crushed coral gravel. To such aquarium was charged 29 gallons of reverse osmosis treated water. The pH was 8.0. The growth medium used in the tank included a General Electric brand Gro-Lite bulb (which had a UV spectrum similar to sunlight) and TETRA-MIN tropical fish food. The water was allowed to cycle through the aquarium for about five days without the addition of any chemicals, live fish, or plants. After five days, twenty-four small bait shop minnows were added to the water and left alone for about two days (about 48 hours). Then, Composition B was added in an amount of 100 parts Composition B by weight per million parts water (i.e., 100 ppm). About thirty minutes after such addition, the dissolved oxygen level was 106 ppm.

After twenty-four hours, the dissolved oxygen level was about 44 ppm and an additional 200 ppm amount of Composition B was added. After thirty minutes, the dissolved oxygen was about 210 ppm. The minnows were observed to be swimming near the bottom of the tank. After an additional twenty-four hours, the dissolved oxygen was 86 ppm. An additional 500 ppm amount of Composition B was then added. Thereafter, a reading for the dissolved oxygen could not be obtained because the dissolved oxygen was so high that the titration medium being used (sodium thiosulfate) kept turning black which prevented an accurate dissolved oxygen reading from being obtained. Even after six hours had passed and over 600 ppm of sodium thiosulfate had been used, a dissolved oxygen reading still could not be obtained.

No additional chemicals were added to the tank for a period of four days. After ten days had passed from the initial application of Composition B, the fish present in the tank began to expire at a rate of about one fish per day over the next two weeks. The scales of about three of the fish appeared to be expanded away from the bodies of such fish. After four weeks had passed since the initial application of Composition B to the tank, the water was still very clear and free of algae growth. The dissolved oxygen was 44 ppm.

The results shown in the above examples clearly demonstrate that the present invention is well adapted to carry out the objects and attain the ends and advantages mentioned as well as those inherent therein.

Reasonable variations, modifications, and adaptations can be made within the scope of the disclosure and the appended claims without departing from the scope of this invention.

The invention claimed is:

1. A process for producing a composition consisting of:
   (a) selecting a hydrogen peroxide solution, wherein the hydrogen peroxide solution consists only of (1) hydrogen peroxide, water, and low solids water having less than 10 ppm dissolved solids; or (2) hydrogen peroxide, water, low solids water having less than 10 ppm dissolved solids, and isopropyl alcohol;
   (b) preparing a glycolic acid solution by mixing a first solution with a low solids water, wherein
      (i) the first solution is, glycolic acid, water, and optionally, isopropyl alcohol,
      (ii) the low solids water has less than 10 ppm dissolved solids,
      (iii) the weight percent of the glycolic acid in the glycolic acid solution is between 1% and 15% by weight, and
      (iv) the glycolic acid solution consists only of (1) the glycolic acid, water, and the low solids water or (2) glycolic acid, water, the low solids water, and isopropyl alcohol; and
   (c) mixing only the hydrogen peroxide solution and the glycolic acid solution to form the composition.

2. The method of claim 1, wherein the weight percent of the glycolic acid in the glycolic acid solution is between 1% and 5%.

3. The method of claim 1, wherein the ratio of the hydrogen peroxide solution with the glycolic acid solution is an amount such that weight ratio of the hydrogen peroxide in the hydrogen peroxide solution and the glycolic acid in the glycolic acid solution is between about 1:1 and 30:1.

4. The method of claim 1, wherein the ratio of the hydrogen peroxide solution with the glycolic acid solution is an amount such that weight ratio of the hydrogen peroxide in the hydrogen peroxide solution and the glycolic acid in the glycolic acid solution is between about 2:1 and 6:1.

5. The method of claim 1, wherein the weight percent of the hydrogen peroxide in the hydrogen peroxide solution is between 0.1 and 20%.

6. The method of claim 1, wherein
   (a) the hydrogen peroxide solution consists only of the hydrogen peroxide, water and the low solids water, and
   (b) the glycolic acid solution consists only of the glycolic acid, water, and the low solids water.

7. The method of claim 1, wherein
   (a) the low solids water has less than 0.1 ppm dissolved solids.

8. The method of claim 1, wherein
   (a) the low solids water has less than 1 ppm dissolved solids; and
   (b) the glycolic acid solution has 5% by weight glycolic acid.

\* \* \* \* \*